United States Patent
Suenaga

(10) Patent No.: US 11,137,074 B2
(45) Date of Patent: Oct. 5, 2021

(54) REGULATOR

(71) Applicant: NIKKI CO., LTD., Atsugi (JP)

(72) Inventor: Naoya Suenaga, Atsugi (JP)

(73) Assignee: Nikki Co., Ltd.

( * ) Notice: Subject to any disclaimer, the term of this patent is extended or adjusted under 35 U.S.C. 154(b) by 0 days.

(21) Appl. No.: 16/789,420

(22) Filed: Feb. 12, 2020

(65) Prior Publication Data

US 2020/0263792 A1  Aug. 20, 2020

(30) Foreign Application Priority Data

Feb. 14, 2019 (JP) .............................. JP2019-024820

(51) Int. Cl.
  *F16K 1/42* (2006.01)
  *F16K 17/34* (2006.01)
  (Continued)

(52) U.S. Cl.
  CPC ........... *F16K 1/42* (2013.01); *F02M 37/0029* (2013.01); *F16K 1/36* (2013.01); *F16K 1/427* (2013.01); *F16K 17/04* (2013.01); *F16K 17/34* (2013.01); *F16K 25/00* (2013.01); *G05D 16/107* (2019.01); *F02M 21/0239* (2013.01); *F16K 17/22* (2013.01); *Y02T 10/30* (2013.01)

(58) Field of Classification Search
  CPC ... F16K 1/42; F16K 1/36; F16K 1/427; F16K 17/04; F16K 17/22; F16K 17/34; F16K 25/00; F02M 37/0029; F02M 21/0239; G05D 16/107; Y02T 10/30
  See application file for complete search history.

(56) References Cited

U.S. PATENT DOCUMENTS 2,888,949 A * 6/1959 Evans .................... A62B 9/022
  137/505.25
3,890,999 A * 6/1975 Moskow .............. G05D 16/103
  137/505.25

(Continued)

FOREIGN PATENT DOCUMENTS

JP  S52-92436 U  7/1977
JP  2017-193078 A  10/2017

OTHER PUBLICATIONS

English abstract for JP-2017-193078.

*Primary Examiner* — Jessica Cahill
*Assistant Examiner* — Patrick C Williams
(74) *Attorney, Agent, or Firm* — Fishman Stewart PLLC

(57) ABSTRACT

A regulator may include an inlet from which a high-pressure fluid is introduced, a valve seat provided at the inlet, and a pressure regulating valve body. The fluid may pass an opening between the valve seat and the valve body formed with a communication passage to a pressure regulating chamber. A load generated by pressure of pressure-regulated fluid acting on a piston unit joined to the valve body may be balanced with a load by a pressure regulating spring in an atmosphere chamber provided coaxially in parallel with the pressure regulating chamber on an opposite side of the piston unit. Fluid pressure of the pressure regulating chamber may be controlled by changing an opening area between a valve-seated seat and the valve body. The valve seat holding the valve-seated seat may be installed on an elastic member via a buffer having a sliding performance.

1 Claim, 3 Drawing Sheets

(51) Int. Cl.
  *F16K 25/00* (2006.01)
  *F16K 1/36* (2006.01)
  *F02M 37/00* (2006.01)
  *G05D 16/10* (2006.01)
  *F16K 17/04* (2006.01)
  *F02M 21/02* (2006.01)
  *F16K 17/22* (2006.01)

(56) References Cited

U.S. PATENT DOCUMENTS

| | | | | |
|---|---|---|---|---|
| 4,194,522 | A * | 3/1980 | Lucas | G05D 16/103 |
| | | | | 137/116.5 |
| 4,887,638 | A * | 12/1989 | Hellquist | A62B 9/02 |
| | | | | 137/505.13 |
| 5,899,221 | A * | 5/1999 | Holt | G05D 16/109 |
| | | | | 137/116.5 |
| 7,401,622 | B2 * | 7/2008 | Ungerecht | G05D 16/0655 |
| | | | | 137/315.04 |
| 2016/0010593 | A1 * | 1/2016 | Taniel | F02D 41/0025 |
| | | | | 123/25 E |

* cited by examiner

REGULATOR

CROSS-REFERENCE TO RELATED APPLICATIONS

This application claims priority to Japanese Patent Application No. 2019-024820, filed on Feb. 14, 2019, the contents of which are hereby incorporated by reference in its entirety.

TECHNICAL FIELD

The present invention relates to a regulator used at the time of reducing a high-pressure fluid to a desired pressure.

BACKGROUND

A regulator that opens and closes a pressure regulating valve body via a piston by pressure fluctuations inside a pressure regulating chamber and controls a flow rate of a high-pressure fluid is disclosed in, for example, JP S52-92436 U and JP 2017-193078 A, and is used, for example, in a pressure regulator or the like used at the time of supplying a high-pressure fuel such as CNG (compressed natural gas) stored in a fuel tank to an engine.

FIGS. 4 to 6 illustrate an example of the conventional regulator. A fuel inlet cover 22 for maintaining fuel airtightness is provided on a fuel inlet 21 side of a passage 2 penetrating a body 1, and a cylindrical valve-seated seat 31 is installed on a fitting portion formed on an outer peripheral end surface of the fuel inlet cover 22 on a side opposite to the fuel inlet 21 side. Further, a valve seat 3 including a valve-seated seat holding member 33 having a plurality of communication passages 32 is sandwiched and fixed between steps inside the body 1.

In addition, a buffer 93 formed using an O-ring made of a polymer material or the like is provided between the fuel inlet cover 22 and the valve-seated seat holding member 33 of the valve seat 3 so that the valve seat 3 can slide in a direction orthogonal to an axis. On the opposite side of the fuel inlet cover 22 of the valve seat 3, a piston pressure regulating valve 7, which has a pressure regulating valve body 5 that opens or closes a valve passage 32 by an expanded distal end surface 51 contacting or separating from the valve-seated seat 31 of the valve seat 3, is arranged slidably in an axial direction of the passage 2.

Further, in the piston pressure regulating valve 7, a piston unit 6 having a diameter larger than a contact diameter of the pressure regulating valve body 5 having a communication passage 52 communicating at the shaft center has a structure to be joined by a coupling hole 62 formed at a central portion thereof, and to be guided along the inner periphery of the passage 2 formed in the body 1 through seal members 91 and 92 on the circumference at an outer peripheral portion immediately adjacent to the pressure regulating valve body 5 and an outer peripheral portion of the piston unit 6, and to be slidable on the axis of the body 1 together with maintaining the fluid airtightness.

Further, a fuel outlet 24 provided with a fuel outlet cover 23 is provided on the outflow side of the piston unit 6 in the passage 2 of the body 1, and a pressure regulating spring 8 is arranged on the side opposite to the fuel outlet 24 of the piston unit 6 in an atmosphere chamber 61, provided coaxially in parallel with the pressure regulating chamber 4 around the piston unit 6, so as to be balanced with a pressure load received by the piston unit 6 on the outer peripheral side of the pressure regulating valve body 5 and is biased toward the fuel outlet 24 of the passage 2.

In this regulator according to the conventional example, high-pressure fuel such as CNG flowing from the fuel inlet 21 passes through the fuel inlet cover 22 of the fuel inlet 21 of the body 1, and flows into the pressure regulating chamber 4 via the valve passage 32 of the valve seat 3.

Here, as an initial stage, the piston pressure regulating valve 7 is pushed by the pressure regulating spring 8, and the high-pressure fuel passes through a gap between the distal end surface 51 of the pressure regulating valve body 5 and the valve-seated seat 31 arranged on the pressure regulating chamber 4 side of the valve seat 3 and flows into the fuel outlet 24 via the communication passage 52 provided at the center of the axis of the pressure regulating valve body 5 forming the piston pressure regulating valve 7. Thereafter, the pressure regulating spring 8 is pushed out using the piston unit 6 as the pressure on the fuel outlet 24 side increases due to the pressure-regulated fuel that has flowed into the fuel outlet 24 to slide the piston pressure regulating valve 7, and thereafter, the communication passage 52 of the pressure regulating valve body 5 comes into contact with the valve-seated seat 31 to be closed when the pressure reaches a certain level, and the fuel is shut off.

At this time, the valve seat 3 on which the valve-seated seat 31 is installed is slidable in the direction orthogonal to the valve axis by the buffer 93 to stabilize the seating of the valve-seated seat 31 and the pressure regulating valve body 5. Thereafter, when the fuel on the fuel outlet 24 side is consumed, the piston pressure regulating valve 7 is pushed again by the pressure regulating spring 8 to open the gap between the valve-seated seat 31 and the pressure regulating valve body 5 so that the fuel flows to the fuel outlet 24 side.

The above operation is repeated, and the gap area between the valve-seated seat 31 and the pressure regulating valve body 5 is changed to maintain the pressure on the fuel outlet 24 side constant.

In such a pressure reducing structure of the conventional regulator, however, a holding load of the valve seat 3 increases due to the crushing cost of the buffer 93 when the pressure regulating valve body 5 is seated on the valve-seated seat 3, and the sliding mechanism of the valve seat 3 is lost, which may lead to a functional loss due to a leakage failure between the valve-seated seat 31 and the pressure regulating valve body 5 in some cases. In addition, it is necessary to strictly manage the dimensional accuracy of peripheral parts in order to solve the above problem, resulting in a problem of increased cost.

SUMMARY

The present invention has been made by focusing on the problems of the conventional regulator, and an object thereof is to provide a regulator which prevents a loss of a sliding mechanism of a valve seat from being led to a functional loss due to a leakage failure between a valve-seated seat and a pressure regulating valve body.

In a regulator according to the present invention made in order to solve the above-described problems, a high-pressure fluid introduced from a fuel inlet passes an opening between a valve seat provided at the fuel inlet and a pressure regulating valve body formed with a communication passage to a pressure regulating chamber provided to face a valve-seated seat arranged on the pressure regulating chamber side of the valve seat, a load generated by pressure of pressure-regulated fluid acting on a piston unit joined to the pressure regulating valve body is balanced with a load by a pressure regulating spring in an atmosphere chamber provided coaxially in parallel with the pressure regulating chamber on an opposite side of the pressure regulating chamber of the piston unit, and fluid pressure of the pressure regulating chamber is controlled by changing an opening area between the valve-seated seat and the pressure regulating valve body. The valve seat holding the valve-seated seat is installed on an elastic member via a buffer having excellent sliding performance for automatic alignment so that uniform contact between the pressure regulating valve body and valve-seated seat is possible.

In the present invention, when the buffer is made of PTFE, the buffer excellent in elasticity and sliding performance can be easily and reliably implemented.

Further, when the elastic member is formed using a compression coil spring, the elastic member can be easily mounted and reliably bias the valve seat in the present invention.

According to the present invention, it is possible to provide the regulator which prevents the loss of the sliding mechanism of the valve seat from being led to the functional loss due to the leakage failure between the valve-seated seat and the pressure regulating valve body.

DETAILED DESCRIPTION

Hereinafter, embodiments for carrying out the present invention will be described with reference to the drawings.

Figure 1:
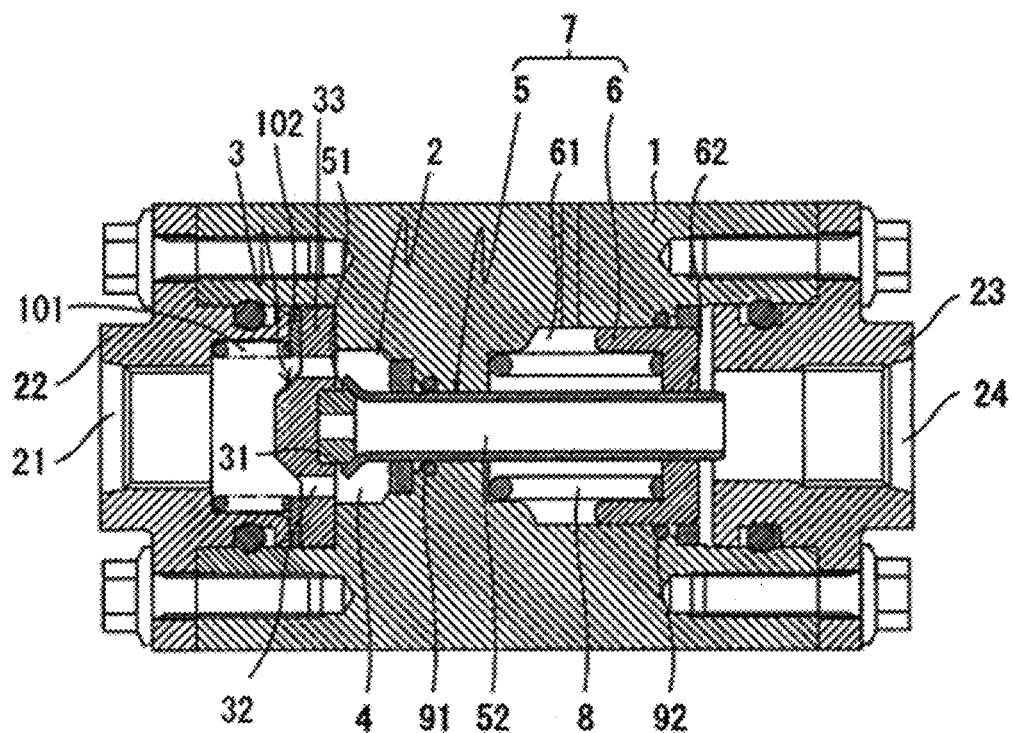
FIG. 1 is a cross-sectional view illustrating a valve closing state according to an embodiment of the present invention.
Figure 2:
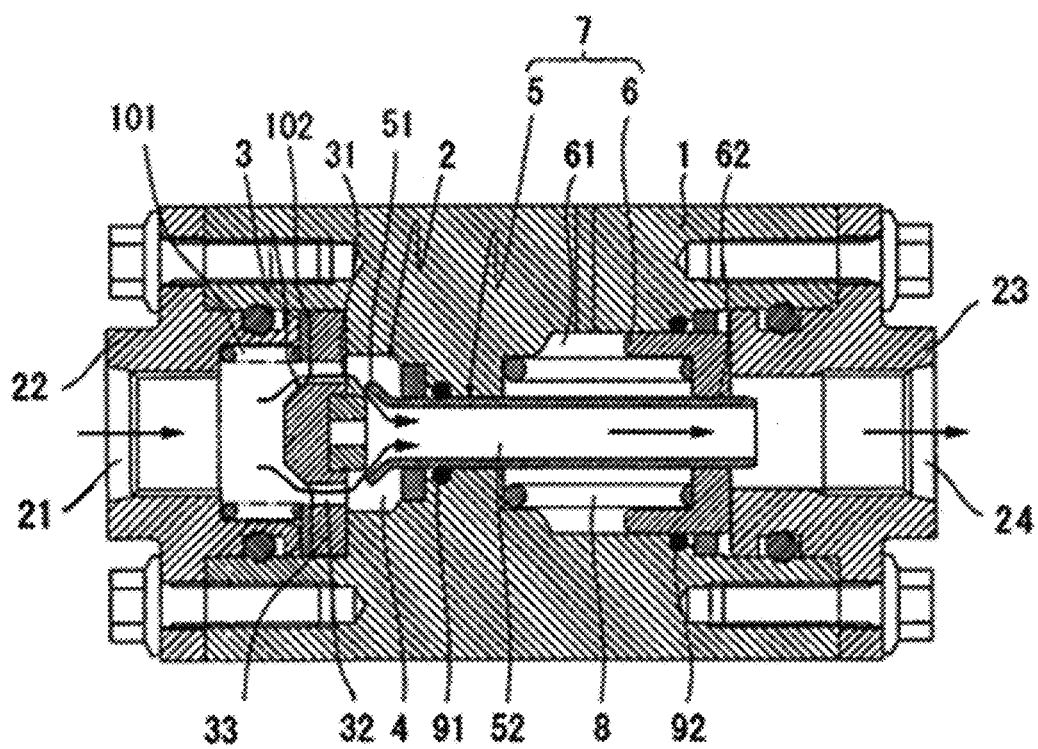
FIG. 2 is a cross-sectional view illustrating a valve opening state according to the embodiment illustrated in FIG. 1.
Figure 3:
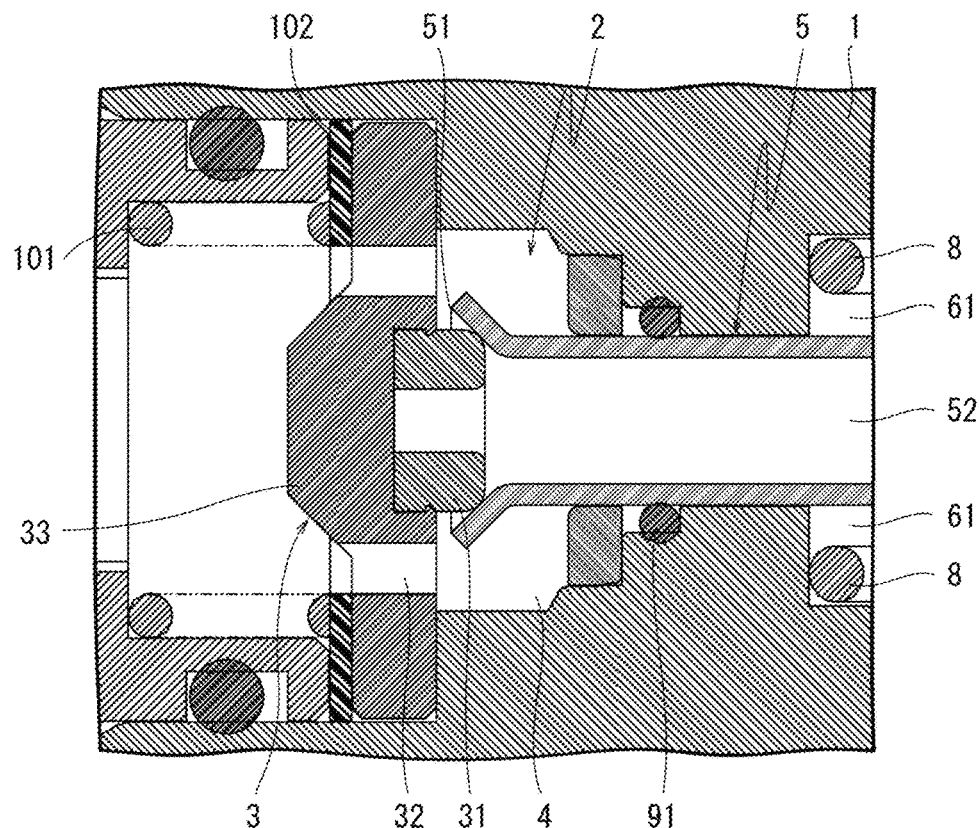
FIG. 3 is an enlarged cross-sectional view of a piston pressure regulating valve portion illustrating the valve closing state according to the embodiment illustrated in FIG. 1.
Figure 4:
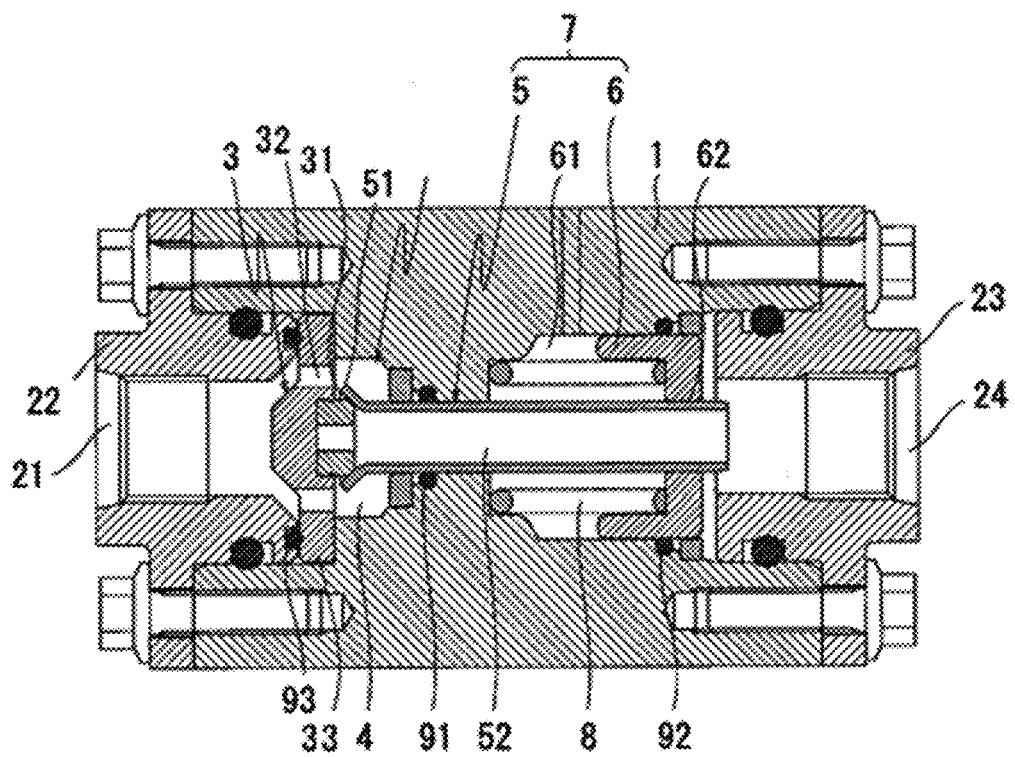
FIG. 4 is a cross-sectional view illustrating a valve closing state according to an embodiment of a conventional example.
Figure 5:
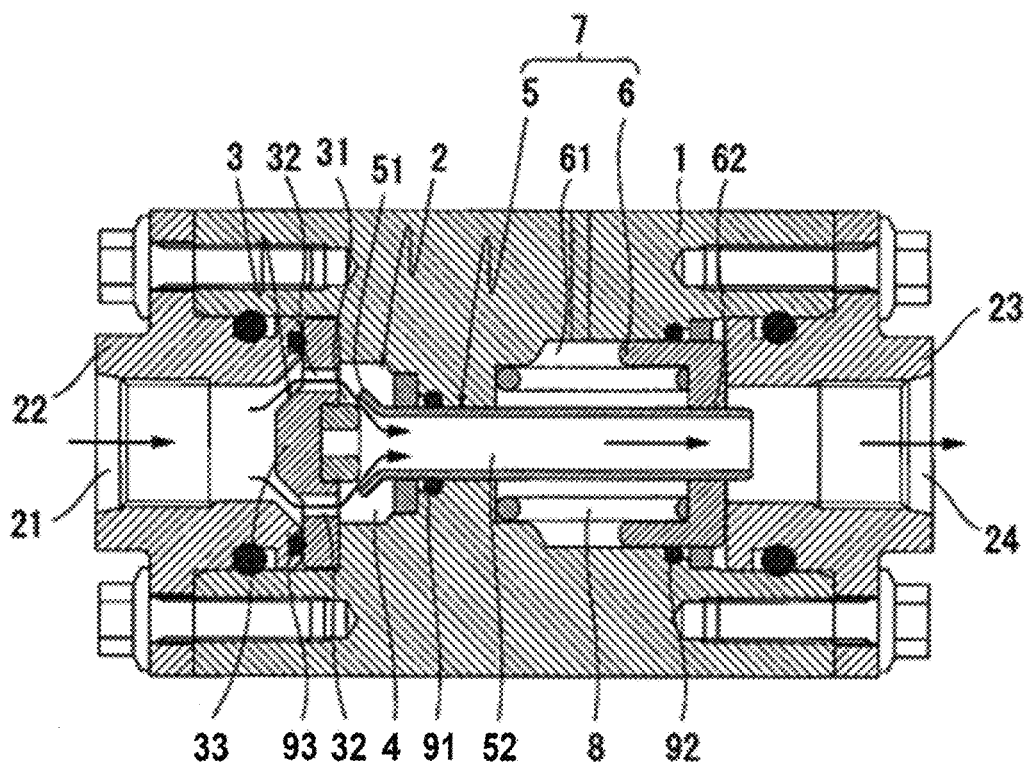
FIG. 5 is a cross-sectional view illustrating a valve opening state according to the conventional example illustrated in FIG. 4.
Figure 6:
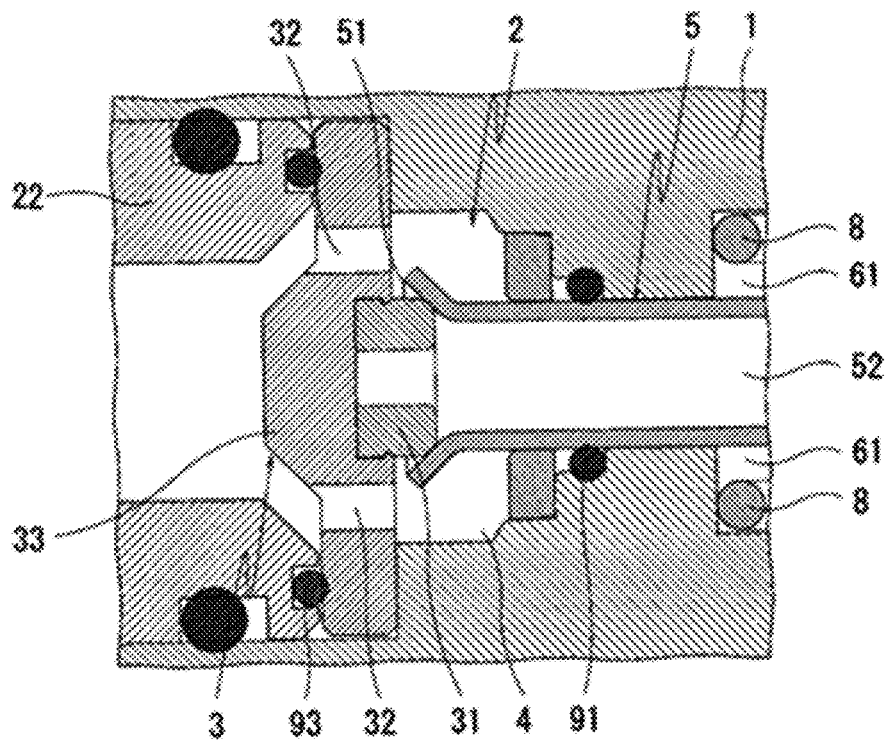
FIG. 6 is an enlarged cross-sectional view of a piston pressure regulating valve portion illustrating the valve closing state according to the conventional example illustrated in FIG. 4.

FIGS. 1 to 3 illustrate cross-sectional views of a preferred embodiment of the present invention, the overall configuration and operation are substantially the same as those of a conventional example illustrated in FIGS. 4 to 6, and the detailed description of those portions will be omitted. In addition, the same components as those in the conventional example will be described with the same reference signs.

In particular, a difference from the conventional example is that a buffer 93 made of a polymer material or the like is provided between a valve seat 3 and a fuel inlet cover 22, which are sandwiched and fixed between steps of a passage 2 penetrating a body 1 so as to enable sliding in a direction orthogonal to an axis in the conventional regulator illustrated in FIGS. 4 to 6, but a valve seat 3 according to the present embodiment is held via an elastic member 101, for example, a spring body, an elastic body, or the like (a resilient coil spring in the present embodiment) provided on a fuel inlet cover 22 side and a buffer 102 formed using a material having excellent sliding performance and durability, for example, PTFE (Poly Tetra Fluoro Ethylene) [Teflon (registered trademark)] or the like.

Therefore, in the present embodiment, when a fuel outlet 24 reaches a certain pressure and a communication passage 52 between a valve-seated seat 31 and a pressure regulating valve body 5 is closed to shut off fuel, a component of a load in a direction orthogonal to the axis generated by the pressure of the fuel outlet 24 received by a piston unit 6 and added to the pressure regulating valve body 5 increases with respect to a frictional resistance in the direction orthogonal to the axis generated from a load of the elastic member 101, so that the valve seat 3 slides in the direction orthogonal to the axis, and the valve-seated seat 31 and the pressure regulating valve body 5 can be stably brought into contact with each other. At this time, an end surface of the fuel inlet cover 22 does not hinder the sliding of the valve seat 3 in the direction orthogonal to the axis by providing a gap between the fuel inlet cover 22 and the buffer 102 holding the valve seat 3.

In particular, in the present embodiment, the buffer 102 is made of PTFE, and thus, is excellent in sliding performance, has heat resistance from a low temperature to a high temperature, and is also excellent in abrasion resistance, so that the buffer 102 hardly deteriorates during use.

In the present embodiment, the buffer 102, which is the member holding the valve seat 3, and the elastic member 101 applying the holding load are used separately instead of the conventional buffer 93 configured to hold the valve seat 3 illustrated in FIGS. 4 to 6, so that the setting of the holding load becomes easy, and difficult dimensional management is not required.

What is claimed is:

1. A regulator comprising:
   a body;
   a passage penetrating the body;
   a fuel inlet from which a high-pressure fluid is introduced;
   a fuel outlet;
   a valve seat provided at the fuel inlet;
   a pressure regulating valve body;
   wherein the high-pressure fluid passes an opening between the valve seat and the pressure regulating valve body, the valve body formed with a communication passage to a pressure regulating chamber;
   wherein a load generated by pressure of pressure-regulated fluid acting on a piston unit joined to the pressure regulating valve body is balanced with a load by a pressure regulating spring in an atmosphere chamber provided coaxially in parallel with the pressure regulating chamber on an opposite side of the piston unit;
   wherein fluid pressure of the pressure regulating chamber is controlled by changing an opening area between a valve-seated seat and the pressure regulating valve body;
   wherein the valve seat holding the valve-seated seat is installed on an elastic member via a ring-shaped buffer that is made of PTFE having a sliding performance for automatic alignment to enable uniform contact between the pressure regulating valve body and valve-seated seat;
   wherein the elastic member is a compression coil spring;
   wherein the valve seat is sandwiched between steps of the passage penetrating the body and the ring-shaped buffer; and wherein the valve seat is located with a gap between its outer circumference and the inner circumference of the passage penetrating the body.

* * * * *